United States Patent
Moeckly et al.

(10) Patent No.: US 9,181,878 B2
(45) Date of Patent: Nov. 10, 2015

(54) OPERATIONS SUPPORT SYSTEMS AND METHODS FOR CALCULATING AND EVALUATING ENGINE EMISSIONS

(75) Inventors: Kevin Moeckly, Chandler, AZ (US); Richard Ling, Phoenix, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 858 days.

(21) Appl. No.: 13/330,326

(22) Filed: Dec. 19, 2011

(65) Prior Publication Data
US 2013/0158832 A1 Jun. 20, 2013

(51) Int. Cl.
*G01M 17/00* (2006.01)
*F02C 9/00* (2006.01)

(52) U.S. Cl.
CPC .............. *F02C 9/00* (2013.01); *F05B 2260/80* (2013.01); *F05B 2270/106* (2013.01); *Y02T 50/677* (2013.01)

(58) Field of Classification Search
USPC .............................. 701/29.1, 31.1, 31.4, 32.4
See application file for complete search history.

(56) References Cited

U.S. PATENT DOCUMENTS

| | | | |
|---|---|---|---|
| 5,551,227 A | 9/1996 | Moulton et al. | |
| 5,682,317 A | 10/1997 | Keeler et al. | |
| 7,421,348 B2 | 9/2008 | Swanson | |
| 7,489,990 B2 | 2/2009 | Fehr et al. | |
| 7,725,199 B2 | 5/2010 | Brackney | |
| 7,742,904 B2 | 6/2010 | Healy et al. | |
| 7,756,591 B2 | 7/2010 | Jia et al. | |
| 7,822,512 B2 | 10/2010 | Thatcher et al. | |
| 7,860,586 B2 | 12/2010 | Boyden et al. | |
| 7,908,072 B2 | 3/2011 | Tonno et al. | |
| 7,917,335 B2 | 3/2011 | Harrison et al. | |
| 7,970,482 B2 | 6/2011 | Srinivasan et al. | |
| 7,997,083 B2 | 8/2011 | Meadows et al. | |
| 8,751,140 B2 * | 6/2014 | Surnilla et al. | 701/123 |
| 2004/0088060 A1 | 5/2004 | Renou et al. | |
| 2005/0131620 A1 | 6/2005 | Bowyer | |
| 2005/0228553 A1 | 10/2005 | Tryon | |
| 2007/0055392 A1 | 3/2007 | D'Amato et al. | |
| 2008/0149081 A1 * | 6/2008 | Allain | 123/568.21 |
| 2008/0243352 A1 | 10/2008 | Healy | |
| 2009/0102296 A1 * | 4/2009 | Greene et al. | 307/149 |
| 2009/0216600 A1 * | 8/2009 | Hill | 705/9 |
| 2010/0145569 A1 * | 6/2010 | Bourque et al. | 701/33 |
| 2010/0228404 A1 * | 9/2010 | Link et al. | 701/1 |

(Continued)

OTHER PUBLICATIONS

Goericke, J. et al.: "Operations Support Systems and Methods with Engine Diagnostics" filed with the USPTO on Dec. 23, 2008 and assigned U.S. Appl. No. 12/342,562.

(Continued)

*Primary Examiner* — Hussein A. Elchanti
(74) *Attorney, Agent, or Firm* — Ingrassia Fisher & Lorenz, P.C.

(57) ABSTRACT

In accordance with an exemplary embodiment, an operations support system for an engine is provided. A diagnostics unit is configured to receive engine data from the engine and to generate condition indicators based on the engine data using a thermodynamic model, the thermodynamic model being based on component maps associated with the engine. An emissions calculation unit is coupled to the diagnostic unit and configured to calculate emissions information for the engine based on the condition indicators. A graphical user interface is coupled to the emissions calculation unit and configured to display the emissions information.

10 Claims, 3 Drawing Sheets

(56) References Cited

U.S. PATENT DOCUMENTS

| | | |
|---|---|---|
| 2011/0046818 A1* | 2/2011 | Herkes et al. .................. 701/3 |
| 2011/0077783 A1 | 3/2011 | Karpman et al. |
| 2011/0099979 A1* | 5/2011 | Xu et al. ...................... 60/274 |
| 2011/0137470 A1* | 6/2011 | Surnilla et al. .............. 700/282 |
| 2011/0246632 A1* | 10/2011 | Tran et al. .................. 709/223 |
| 2011/0265773 A1* | 11/2011 | Xu et al. ..................... 123/703 |
| 2012/0041638 A1* | 2/2012 | Johnson et al. ............. 701/33.1 |
| 2012/0191290 A1* | 7/2012 | Bourque et al. ............ 701/29.1 |
| 2013/0096895 A1* | 4/2013 | Willard et al. .................. 703/8 |
| 2014/0180559 A1* | 6/2014 | Light-Holets ................ 701/102 |

OTHER PUBLICATIONS

Moeckly, K., et al.: "Operations Support Systems and Methods with Power Assurance" filed with the USPTO on Dec. 23, 2008 and assigned U.S. Appl. No. 12/342,633.

Moeckly, K., et al.: "Operations Support Systems and Methods with Power Management" filed with the USPTO on Dec. 23, 2008 and assigned U.S. Appl. No. 12/342,581.

* cited by examiner

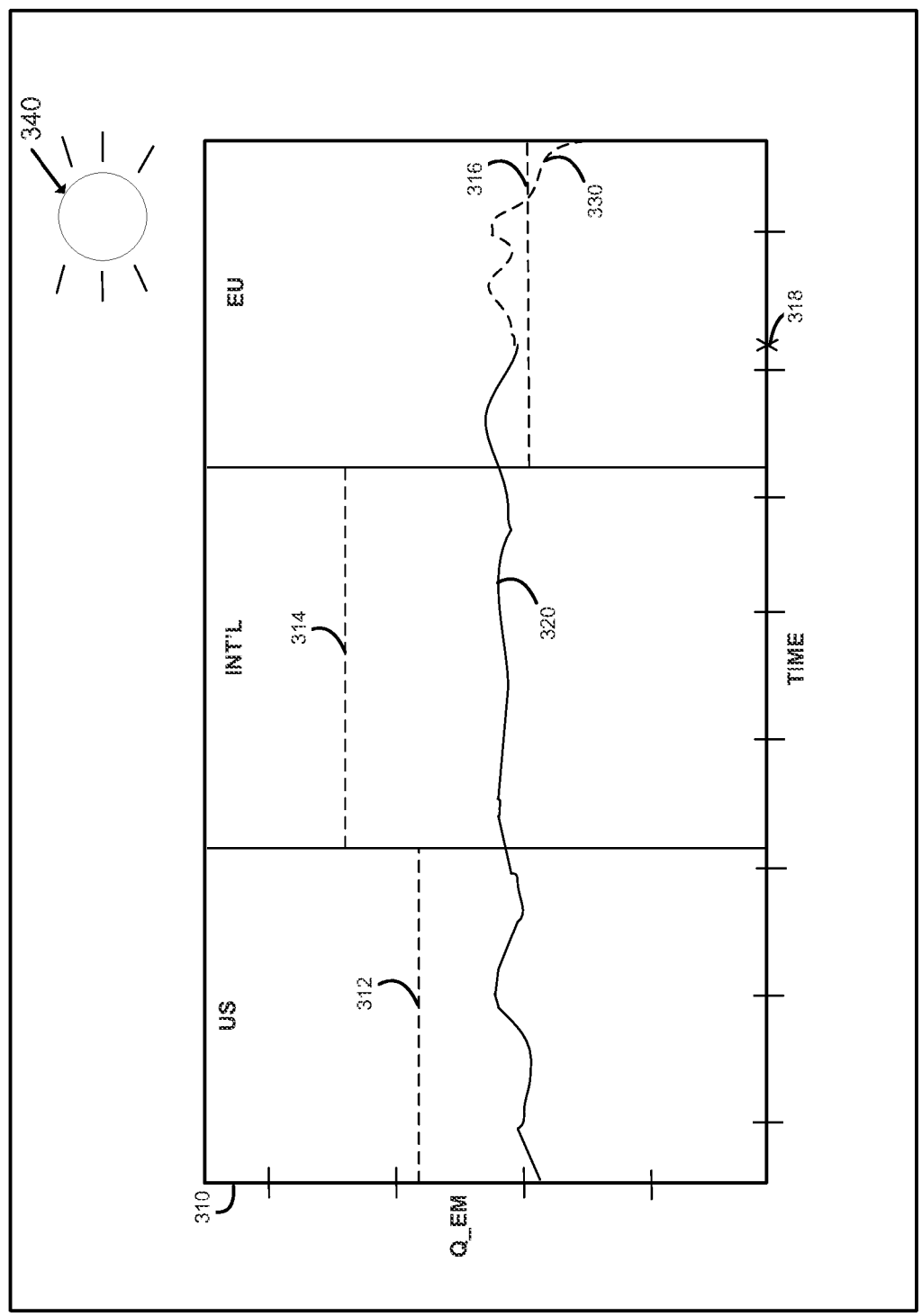

OPERATIONS SUPPORT SYSTEMS AND METHODS FOR CALCULATING AND EVALUATING ENGINE EMISSIONS

TECHNICAL FIELD

The subject invention relates to the operations support of gas turbine engines, and more particularly, to operations support systems and methods for calculating and evaluating engine emissions.

BACKGROUND

It is desirable to determine the emissions associated with operation of a gas turbine engine. Such emissions are currently estimated based on information from the engine manufacturer, typically estimated for a nominal engine condition and operation. Alternatively, emissions may be estimated based on sampling from emissions sensors at the exhaust system. Conventional emissions estimations may not be sufficiently accurate. Real-time engine emissions depend on numerous parameters, including fuel, operating speed and other operating characteristics, and individual engine characteristics. Conventional estimations may not capture all of these parameters.

The operation of a gas turbine engine powered aircraft would be significantly enhanced if the pilot could be provided with real-time information concerning the engine emissions. For example, knowing the emissions may enable operating changes to improve emissions, provide health information about the engine, and/or enable improved compliance with environmental regulations.

Accordingly, it is desirable to provide improved operations support systems and methods that generate improved emissions information. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an operations support system for an engine is provided. A diagnostics unit is configured to receive engine data from the engine and to generate condition indicators based on the engine data using a thermodynamic model, the thermodynamic model being based on component maps associated with the engine. An emissions calculation unit is coupled to the diagnostic unit and configured to calculate emissions information for the engine based on the condition indicators. A graphical user interface is coupled to the emissions calculation unit and configured to display the emissions information.

In accordance with another exemplary embodiment, a method is provided for supporting operations of an engine. The method includes collecting engine data; generating condition indicators from the engine data using a thermodynamic model based on component maps associated with the engine; generating emissions information of the engine from the condition indicators; and displaying the emissions information on a graphical user display.

BRIEF DESCRIPTION OF THE DRAWINGS

The present invention will hereinafter be described in conjunction with the following drawing figures, wherein like numerals denote like elements, and wherein:

FIG. 3 is a schematic representation of a visual display rendered on a graphical user interface of the operations support system of FIG. 2 in accordance with an exemplary embodiment.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein relate to operations support systems and methods. More specifically, exemplary embodiments include an engine diagnostics unit that receives engine data from an aircraft engine and generates engine emissions information based on the engine data using a thermodynamic model. The thermodynamic model may be based on component maps and be modified based on scalars. The emissions information may be used to modify engine operation and/or reduce engine emissions.

Figure 1:
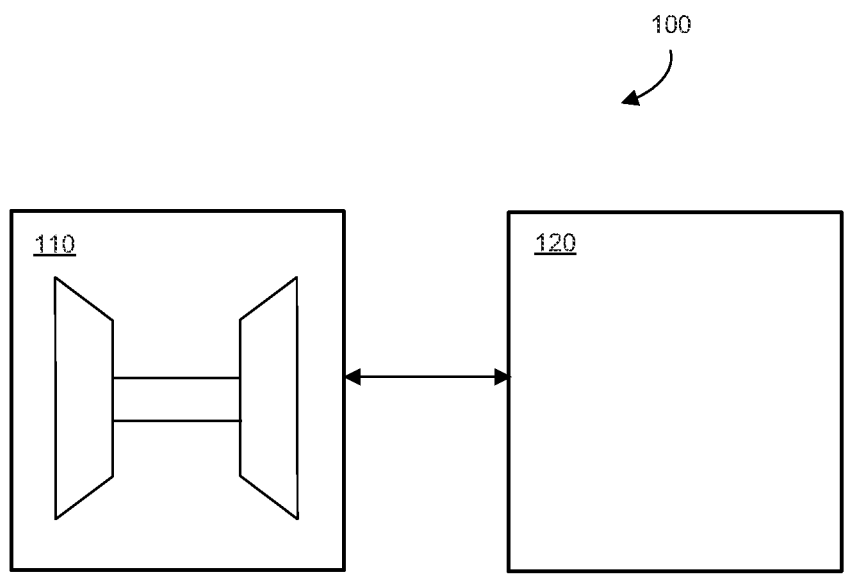
FIG. 1 is a block diagram of an aircraft system in accordance with an exemplary embodiment.

FIG. 1 is a block diagram of an aircraft system 100 in accordance with an exemplary embodiment. In general, the aircraft system 100 includes an engine system 110 and an operations support system 120. The engine system 110 may include a gas turbine engine, such as an engine for an aircraft. In one exemplary embodiment, the engine system 110 can include compressors that supply compressed air to a combustor. The compressed air can be mixed with fuel and ignited in the combustor to produce combustion gases. The combustion gases are directed to high pressure and low pressure turbines that extract energy, for example, to provide horsepower. In general, the system 100 disclosed herein may be employed in conjunction with any gas turbine engine configuration. In one exemplary embodiment, the engine system 110 is a gas turbine engine for an aircraft, such as a helicopter. As discussed in greater detail below, the operations support system 120 may be used to support a single engine system 110 or a number of engines, such as for a fleet of aircraft.

The operations support system 120 generally supports and sustains operation of an engine system 110. For example, the operations support system 120 processes engine data from the engine system 110; provides information about the engine system 110 to the pilot, maintenance crew, and other interested parties; and optionally, controls operation of the engine system 110. As described below, the operations support system 120 additionally provides information about emissions, including real-time or current emissions information and emissions predictions.

In general, the operations support system 120 is located on-board the aircraft. However, any of the components of the operations support system 120 may be alternatively located off-board the aircraft or a combination of on-board and off-board the aircraft. In one exemplary embodiment, the operations support system 120 may be embedded on-board an aircraft within a Full Authority Digital Engine Control (FADEC), an engine control unit (ECU), or a Health and Usage Monitoring Systems (HUMS) unit.

Figure 2:
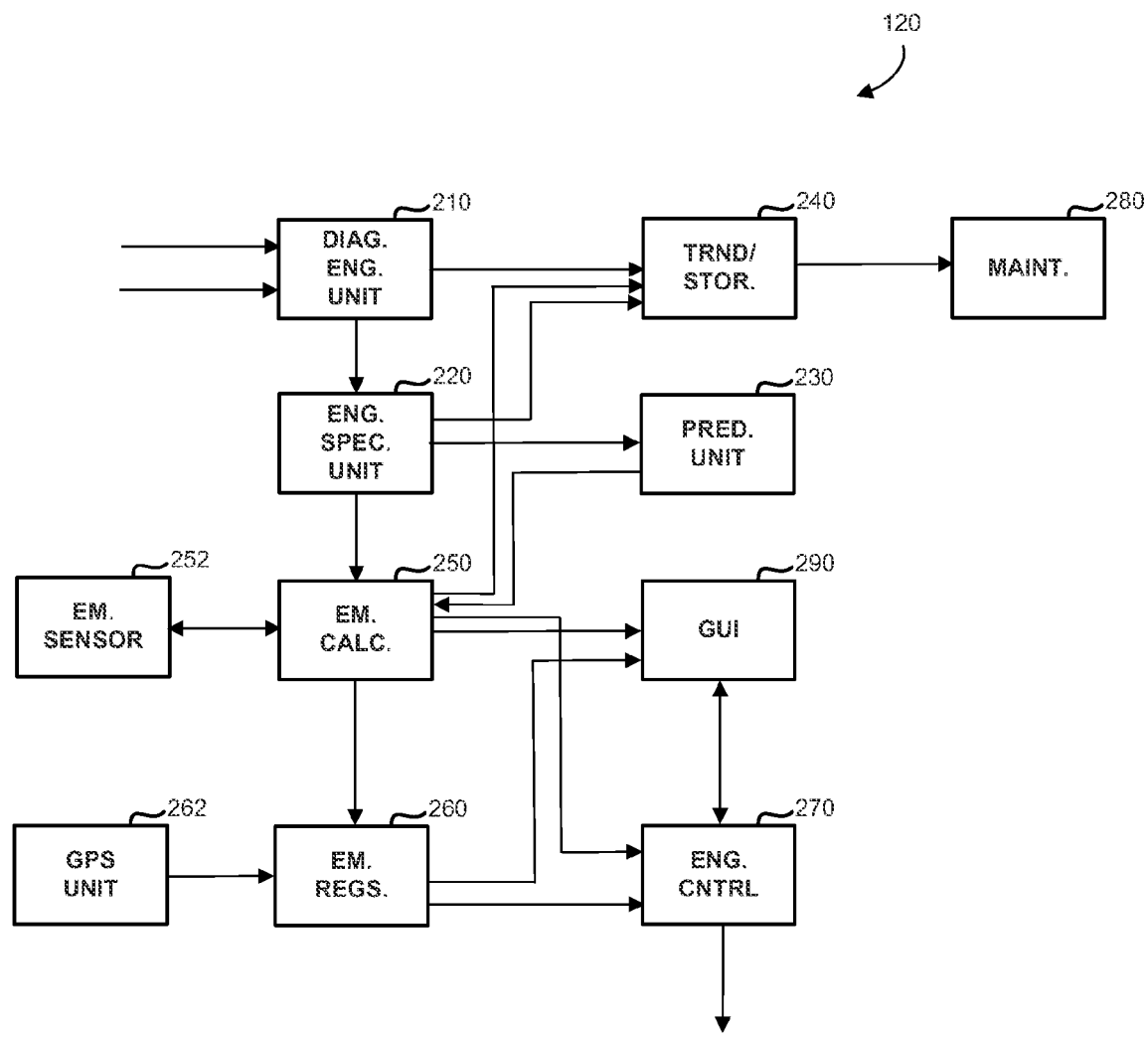
FIG. 2 is a block diagram of an operations support system for supporting and sustaining operation of an engine in accordance with an exemplary embodiment.

FIG. 2 is a more detailed, block diagram of the operations support system 120 of FIG. 1. As shown, the operations support system 120 includes a number of functional units or modules 210, 220, 230, 240, 250, 260, 270, 280, and 290. The units 210, 220, 230, 240, 250, 260, 270, 280, and 290 each contain or share processing components necessary to accomplish the individual and collective functions discussed in greater detail below. As some examples, the processing components may include digital computers or microprocessors with suitable logic circuitry, memory, software and communication buses to store and process the models within the units discussed below.

As described below, the operations support system 120 receives data from various parts of the aircraft and such data may be generated by the on-board the aircraft or received from external systems, aircraft, or ground operations that are off-board the aircraft. In particular, the operations support system 120 may receive aircraft instrumentation data from, for example, the cockpit, pilot, or other system and engine instrumentation data from the engine system 110 (FIG. 1). The operations support system 120 may further receive emissions information from emissions sensors 252 located at or near the engine exhaust and location information from a GPS unit 262.

In one exemplary embodiment, the operations support system 120 includes a diagnostic engine model unit 210 that receives the aircraft instrumentation data and engine instrumentation data as input parameters. As an example, the aircraft instrumentation data and the engine instrumentation data may include any suitable type of data related to the engine or aircraft, such as for example, one or more of the following: engine operating hours; static pressure, total pressure, and temperature at various positions within the engine system 110 (FIG. 1), such as the inlet or outlet of the compressors, combustor, and turbines; gas producer speed; engine torque; engine torque sensor voltage; temperature at the oil resistance bulb; and metered fuel flow. Other engine data can include the calibrated airspeed of the aircraft, ambient temperature, and ambient total pressure. In general, any and all parameters available to systems 110 and 120 are available for use by model unit 210. The diagnostic engine model unit 210 generally evaluates the input parameters and generates diagnostic indicators.

The diagnostic model of the diagnostic engine model unit 210 develops scalars for each engine major engine component. The diagnostic scalars are collected, trended, and statistically and otherwise evaluated to produce a broad range of scalars for each component that, at this point, represents the true aspects of that component. These components are usually but not limited to the aerodynamic rotational components of the engine system 110 (FIG. 1) that are in basic form represented by maps within the engine model. In one exemplary embodiment, the diagnostic engine model unit 210 provides signal conditioning such as in-range and signal validity checks, unit conversion, scaling, filter/sampling, and steady state detection. The diagnostic engine model unit 210 provides the diagnostic indicators to the data trending and storage unit 240, as will be discussed in greater detail below.

The diagnostic indicators from the diagnostic engine model unit 210 are also provided to an engine-specific model unit 220. The engine-specific model unit 220 includes high-fidelity mathematical representation of the engine system 110 (FIG. 1) for steady state engine diagnostics. This mathematic representation may be referred to as an engine-specific model. The diagnostic indicators from the diagnostic engine model unit 210 are processed through the engine-specific model to produce diagnostic scalars (or condition indicators/engine parameters), as discussed below. As noted above, the diagnostic scalars are developed in the diagnostic engine model. As the diagnostic scalars are applied to the engine-specific model unit 220, which is a similar model to that of the diagnostic engine model unit 210, without the diagnostic capability of the model, the model becomes a model specific to the engine when generating the diagnostic scalars. In other words, at this point the model is an engine-specific model and represents only that particular engine at that point in time.

Generally, the engine specific model is embedded in the operations support system 120 to provide continuous engine monitoring for health and/or other types of engine attributes. Engine diagnostics are achieved through adaptation of specific component parameters as diagnostic scalars within the diagnostic model to measured engine states.

In one embodiment of the engine-specific model unit 220, scalars are the difference between expected engine states and the actual engine states. These differences could be a result, for example, of engine-to-engine differences and/or erosion of engine components. In one example, the scalars can represent the erosion of the turbine blades. The scalars may be utilized as coefficients, biases, and adders used to adjust the aero-thermodynamic representation of the model. As one example, the scalars function to scale engine component airflows and efficiencies to match the measured data. This matching process is accomplished by executing an adaptive algorithm that iteratively adjusts or adapts the nominal engine component efficiencies using the scalars. As such, the thermodynamic engine model accurately mirrors actual engine performance over time, and the model is improved as an engine-specific model.

The model of the engine-specific model unit 220 is complete over the entire operating range of the engine system 110 (FIG. 1). The model is true to the workings of the actual gas turbine engine system 110 (FIG. 1), and the manifestations of component-level as well as engine-level performance changes from what would be considered a "nominal" engine are superior to empirical, algorithm-based models. In contrast, the interaction of empirical, algorithm-based models can easily become skewed or distorted from "true" performance, yet this distortion is not inherently obvious when analyzing model-produced results from such a system. A component-level map-based aero-thermodynamic physics model is much more robust and accurate over the lifespan of an engine and produces higher fidelity representations of its components.

In summary, the engine-specific model unit 220 uses one or more component-level, map-based aero-thermodynamic models to obtain component-level map scalars that characterize a specific engine, which in turn produces an engine-specific model that is a high-fidelity representation of the engine itself. The engine-specific model unit 220 provides the engine diagnostic scalars to the data trending and storage unit 240, as will be discussed in greater detail below. The engine-specific model unit 220 may be in contrast to an algorithm-based system that uses mathematical equations to try to develop relationships between one parameter and one or more parameters in the engine. These conventional models may lose accuracy as the engine deviates from a "nominal" state over time or into more extreme operation, away from where the algorithms were developed. In contrast, the model of the engine-specific model unit 220 represents the true aerophysical relationships in the engine in the same way a map-based component-specific model does. Because the component maps have first been developed with high-fidelity design practices and tools, then tested extensively in strictly-controlled "rigs" over the complete operating range of the component, and subsequently confirmed in the engine with multiple highly-instrumented, highly controlled engine-level testing, the map-based components may offer an advantageous representation of a gas turbine engine and the associated engine performance.

The predictive unit 230 receives the engine diagnostic scalars from the engine-specific model unit 220 and evaluates the scalars with a thermodynamic model similar to that of the engine-specific model unit 220 with the exception that the thermodynamic model of the predictive unit 230 does not react to engine data. As such, the predictive unit 230 may have a model similar to that of the engine-specific model unit 220 except that the model is predictive. In particular, the predictive unit 230 trends the component scalars over and projects the diagnostic scalars from the present to a time in the future to establish an engine-specific prediction model to forecast engine performance under user-supplied conditions as prognostic indicators. In "predictive" mode, the model is no longer "engine-specific," but is a "future engine-specific" model. As such, the model of the predictive unit 230 may then be used to predict engine performance at a specific rating condition (e.g., inlet temperature, altitude, power, installation configuration, and the like) to produce prognostic indicators. The predicted engine performance from the predictive unit 230 is also provided to the data trending and storage unit 240. The output that may be trended includes engine output performance, such as temperatures, fuel flow, speeds, and powers, as well as specific component efficiencies, airflows, and pressure ratios.

The emissions calculation unit 250 receives emissions data from the emissions sensors 252, engine diagnostic scalars from the engine-specific model unit 220, and prognostic indicators from the predictive model unit 230. In turn, the emissions calculation unit 250 calculates the real-time emissions of the engine system 110. The embedded emissions calculations may be empirically established to use the pertinent gas path parameters to accurately calculate engine emissions. For example, the emissions calculations may use proper gas properties, gas molecular constituents, gas temperatures and pressures and flows, and fuel flows, temperatures, and properties throughout the engine system. Accurate calculations of emissions may use the temperatures, pressures, flows, and fuel flows from the units 210, 220, and 230 discussed above. This model may more easily lend itself to accurate emissions calculations using such model-generated information. The coding for these emissions calculations may be updated or modified if new information becomes available.

As discussed above, the operations support system 120 also receives emissions data from emissions sensors 252, which may or may not be considered part of the operations support system. Emissions sensors can include sensors that detect indications of NOX, CO, CO2, particulates, and unburned hydrocarbons, for example, and are most commonly used to sample the engine exhaust gas stream. The emissions calculation unit 250 may also make use the emissions sampling from the emissions sensors 252 in the emissions calculations, to recalibrate emissions calculation routines of the emissions calculation unit 250, to refine calculations, and/or as a validity check against calculated emissions. Such calibration may occur in flight or in a ground-based equipment setting, during maintenance, or any other sort of bench testing equipment. In some embodiments, the emissions sensors 252 may be omitted and the calibration may be obtained by other mechanisms.

The emissions calculation unit 250 may also estimate the emissions of future engine use, e.g., using the prognostic indicators from the predictive unit 230. The emissions calculation unit 250 provides the real-time emissions and the predicted emissions to the data trending and storage unit 240. For example, the emissions information may be considered with aircraft avionics or other positioning system to track emissions output over the actual flown flight path. Although illustrated as a separate unit, in other embodiments, the emissions calculation unit 250 may be integrated with the engine-specific model unit 220.

The emissions information is also provided to an emissions limit unit 260. The emissions limit unit 260 compares the predicted and/or real-time emissions to the appropriate rules, laws, and regulations (e.g., generally "standards") concerning such emissions. In one exemplary embodiment, the emissions limit unit 260 may also receive a current or predicted location of the aircraft from the GPS unit 262, which may or may not be considered part of the operations support system 120. As such, the emissions limit unit 260 may compare the predicted and/or real-time emissions to location-specific standards to produce emissions compliance information.

The emissions compliance information from the emissions limit unit 260 is provided to an engine control unit 270. The engine control unit 270 may evaluate the emissions compliance information to determine if engine operation may be modified to lower the emissions and/or comply with applicable emissions standards. For example, with information about current emissions, the control of these emissions may be implemented using available engine-controllable variables to alter the engine state while meeting engine output requirements and/or adjusting engine output. In one exemplary embodiment, operation modification may include varying engine speed, variable geometry, engine bleed, fuel flow, fuel choice, exhaust parameters, and/or environmental changes. Additionally, as described below, the engine control unit 270 may make these adjustments automatically and/or provide suggestions for pilot intervention or choice in engine operating mode. In one exemplary embodiment, the engine control unit 270 may alter one of these variables of engine operation until the desired emissions level was reached, while still maintaining overarching confines, such as output power, generator frequencies, bleed flow, and the like. The location from the GPS unit 262 may also be considered by the engine control unit 270 in evaluating and/or implementing the appropriate response.

The emissions information and emissions compliance information may be provided to a graphical user interface (GUI) 290, for example, located in the aircraft cockpit for consideration by the pilot. The GUI 290 generally includes any suitable display device for displaying the information described herein and an input device for interacting with the operations support system 120. Such displays may include any suitable type of display medium capable of visually presenting multi-colored or monochrome flight information for a pilot or other flight crew member can be provided, such as, for example, various CRT and flat-panel display systems (e.g., CRT displays, LCDs, OLED displays, plasma displays, projection displays, HDDs, HUDs, etc.). The GUI 290 may form part of a Primary Flight Display and/or Multi-Function Display Unit.

As noted above, the data trending and storage unit 240 may receive data from a number of sources, including input parameters from the engine (e.g., engine system 110), diagnostic indicators from the diagnostic engine model unit 210, engine parameters from the engine-specific model unit 220, prognostic indicators from the predictive model unit 230, and emissions information from the emissions calculations unit 250. The data trending and storage unit 240 provides binning and storing of this data, as well as statistical analysis and trending for use in historical analysis or emissions performance over time. As an example, aircraft location from the GPS unit 262 may be used as a trendable parameter. Data trending of the emissions calculations may be used to increase confidence in these numbers.

As an historical unit, the system 120 provides evidence of not only an emissions rate of the engine at any chosen time, but also as evidence of cumulative emissions over a chosen segment of time, such as time spent at a particular location (e.g., an airport). With historical records of emissions, and trending versus time, usage level, and location, projections may also be made as to emissions levels in the future. In this way, an engine may be designated for maintenance actions prior to violating emissions regulations, or chosen for use in alternate applications. Trending of data also provides the opportunity to remove certain data or predictions if determined to be an anomalous. With an appropriate database of past engine performance and emissions, any number of projections or uses of this history may be made.

In one exemplary embodiment, statistical analysis of the data collected and generated by the operations support system 120 in the data trending and storage unit 240 may be considered by a maintenance unit 280 to determine if the engine requires maintenance. For example, such data may result in the ground crew adjusting the maintenance schedule of the aircraft and/or taking corrective action with respect to emissions issues.

FIG. 3 is a visual display 300 rendered on the GUI 290 in accordance with an exemplary embodiment. The visual display 300 may include any of the parameters, inputs and/or outputs discussed above, including health indicators, engine input data, diagnostic scalars, maintenance information, and the like. In this exemplary embodiment, the visual display 300 includes emissions information 310. The emissions information 310 includes time on the horizontal axis and a quantity (e.g., pounds of $CO_2$) on the vertical axis. As noted above, the emissions information 310 may be based on location provided by the GPS unit 262 and standards from the emissions limit unit 260. As shown, emissions are calculated over time, as indicated by line 320. As noted above, emissions information may be plotted according to the location of the aircraft and the appropriate emissions standard, as indicated by lines 312, 314, and 316. In the example shown, emissions were estimated to be within the appropriate standard in the initial segments of the trip when the aircraft is flying in the US and international airspace. However, when the aircraft enters the EU, the standards are more strict, and the current emissions are higher than the appropriate standard in this example. A warning 340 may be provided to the pilot or user when the current emissions are greater than the standard. In FIG. 3, the current time is indicated by line 318, and the emissions information 310 further estimates the future emissions (noted by dashed line 330) to provide an indication about the future performance of the aircraft. As shown in FIG. 3, the emissions may be expected to fall below the respective standard 316. In other embodiments, suggested or automatic engine control modifications (e.g., provided by the engine control unit 270) are displayed on the display 300. Examples of such messages include "reduce fuel," "adjust speed," and/or "modify route."

As such, the operations support system 120 enables improved engine operation by continuous display of emissions conditions to a pilot, prevention of unintentional emissions, and enabling compliance or reduction of emissions. This results in a reduction in pilot and crew workload, a reduction in emissions, and improved situational awareness.

As noted above, the operations support system 120 is discussed in conjunction with an aircraft engine. However, other types of engine applications may be provided. Applicable engine applications include, but are not limited to, airplane propulsion (fan, turbojet, turboshaft, turboprop), helicopter propulsion (turboshaft), and aircraft auxiliary power units, ground power unit, power generation sets, shipboard power systems, and industrial gas turbines.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An operations support system for an engine, comprising:
   a diagnostic engine model unit configured to receive engine data from the engine and to generate diagnostics data based on the engine data;
   an engine-specific model unit coupled to the diagnostic engine model unit and configured to receive the diagnostics data from the diagnostic engine model unit and to generate engine diagnostic scalars using an engine-specific thermodynamic model, the thermodynamic model being based on component maps associated with the engine;
   an emissions calculation unit coupled to the engine-specific model unit and configured to calculate emissions information for the engine based on the engine diagnostic scalars; and
   a graphical user interface coupled to the emissions calculation unit and configured to display the emissions information.

2. The operations support system of claim 1, further comprising a GPS unit coupled to the graphical user interface and configured to provide a location of the engine to the graphical user interface.

3. The operations support system of claim 2, wherein the graphical user interface is configured to display the emissions information as a function of the location.

4. The operations support system of claim 3, further comprising an emissions limit unit coupled to the graphical user interface and configured to provide emissions standards for the location to the graphical user interface.

5. The operations support system of claim 4, wherein the graphical user interface is configured to display the emissions information as a function of the emissions standards and the location.

6. The operations support system of claim 1, further comprising an emissions sensor coupled to the emissions calculations unit and configured to provide emissions data to the emissions calculations unit.

7. The operations support system of claim 6, wherein the emissions calculations unit is configured to calibrate the calculation of the emissions information.

8. The operations support system of claim 1, wherein the emissions calculations unit is configured to calculate the emissions information in real-time.

9. The operations support system of claim 1, wherein the emissions calculations unit is configured to calculate the emissions information based on engine temperature, engine air pressure, engine air flow, and engine fuel flow.

10. The operations support system of claim 1, wherein the engine-specific model unit is further configured to adjust the engine-specific thermodynamic model based on the engine diagnostic scalars.

* * * * *